Aug. 10, 1926.

B. H. SMITH 1,595,738

TEMPERATURE INDICATOR FOR GAS ENGINES

Filed Nov. 16, 1921

WITNESSES:

INVENTOR
Benjamin H. Smith.
BY
ATTORNEY

Patented Aug. 10, 1926.

1,595,738

UNITED STATES PATENT OFFICE.

BENJAMIN H. SMITH, OF WILKINSBURG, PENNSYLVANIA, ASSIGNOR TO WESTING-
HOUSE ELECTRIC & MANUFACTURING COMPANY, A CORPORATION OF PENNSYL-
VANIA.

TEMPERATURE INDICATOR FOR GAS ENGINES.

Application filed November 16, 1921. Serial No. 515,516.

My invention relates to temperature indicators and particularly to the method of and means for, indicating the temperature of internal combustion engines.

One object of my invention is to provide a temperature indicator for an automobile engine that may be mounted on the dash board and that shall be directly energized by the heat of the engine.

Another object of my invention is to provide a temperature indicator, of the above-indicated character, that shall have relatively small heat-storage capacity whereby it may quickly respond to variations in the temperature of the engine.

Another object of my invention is to provide means of the above-indicated character, to indicate the thermal condition of the engine, that shall be relatively simple and inexpensive in construction and effective in its operation.

In practicing my invention, I utilize the heat of the engine and the large coefficient of thermal conductivity of pure copper wire to conduct such heat from the engine to heat a bimetallic spring having a relatively small heat-storage capacity. A pointer actuated by the bimetallic spring registers with a calibrated scale to indicate the thermal condition of the engine. By reason of the small heat-storage capacity of the bimetallic spring, its temperature very quickly responds to changes in the temperature of the engine.

Figure 1:
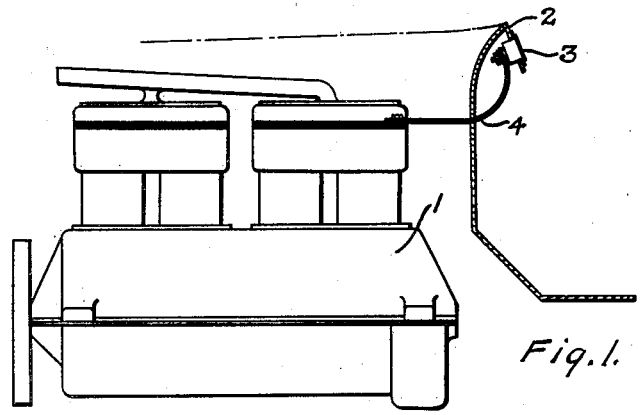
Figure 1 is a perspective view of an automobile engine and the dash board illustrating the disposition of the temperature indicator embodying my invention.
Figure 2:
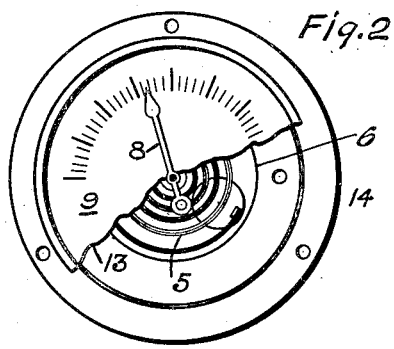
Fig. 2 is a front elevational view of the indicator with a part broken away from the casing to illustrate the disposition of the bimetallic spring therein.

Referring to Fig. 1, an engine 1, the temperature of which is to be measured, is disposed adjacent the dash board 2, upon which is mounted a temperature indicator 3. A copper conductor 4 having a relatively large heat-conducting coefficient is connected between the casing of the engine 1 and the thermal responsive element of the indicator 3.

The temperature indicator 3 comprises a thermal responsive bimetallic spring 5 disposed in a shell 6. The spring 5 is disposed on a relatively small shaft 7 that is supported by the shell 6 and that is free to turn when actuated by the bimetallic spring 5. One end of the spring 5 is secured to the shaft 7 and the other end is secured to the shell 6. A pointer 8 of relatively light weight is secured to, and actuated by, the shaft 7 and co-operates with a properly calibrated scale 9 on a portion of the shell 6 to indicate the thermal condition of the engine 1.

The conductor 4 is connected between the rear end of the engine and two terminals 10 and 11 disposed on the shell 6 which serve as securing means between the several parts of the device. Both terminals are secured to the shell 6 and terminal 11 is connected directly to the bimetallic spring to serve as the securing means for the stationary end thereof. The conductor 4 thus serves to conduct heat to the shell 6 and to the bimetallic spring 5 to maintain the temperature thereof substantially the same as the temperature of the engine 1. By suitably lagging or insulating the conductor 4 and the shell 6 to prevent dissipation of heat therefrom, the temperature of the bimetallic spring 5 may be maintained substantially equal to the temperature of the engine 1. By reason of the small heat-storage capacity of the bimetallic spring and the enclosing shell, the temperature thereof will respond very quickly to the changes in the temperature of the engine 1.

The shell 6 is enclosed in a casing 12 that is provided with a glass window 13 to permit observation of the pointer 8 and the scale 9. The casing 12 is also provided with a supporting flange 14 to permit the indicator to be secured to the dashboard 2. The terminals 10 and 11 are insulated from the casing 12 by washers 15 of non-heat-conducting material to preclude the conduction of heat from the shell 6 and the bimetallic spring 5.

Figure 4:
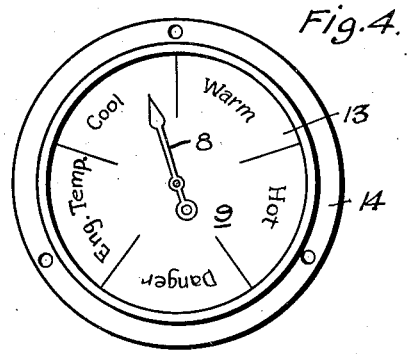
Fig. 4 is a front elevational view of the indicator illustrating another form of calibration of the scale.

By reason of the fact that one surface of the shell 6 has the scale 9 mounted thereon, the manufacturing cost of such a device is considerably reduced. The scale 9 of the indicator may be calibrated to indicate thermal conditions, such as indicated in Fig. 4, or it may be calibrated to indicate directly the actual temperature of the engine.

Figure 3:
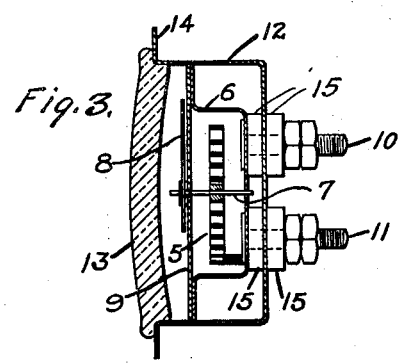
Fig. 3 is a sectional view partially in elevation illustrating the construction of the casing enclosing the thermal bimetallic spring.

By disposing the shell 6 within the casing 12, as is illustrated in Fig 3, a dead air space is maintained around the shell, and dissipation of heat therefrom is effectively reduced.

Although I have illustrated the indicator as applied to an automobile engine, it is obvious that it may be similarly applied to any heat-developing apparatus. Such an indicator is applicable to either water or air cooled engines as it is not dependent upon the temperature of the cooling water. Furthermore, it need not be mounted on the radiator but may be disposed in any convenient position on the dashboard of the automobile.

My invention is not limited to the specific arrangement of the elements as is illustrated but may be variously modified within the spirit and scope of the invention as set forth in the accompanying claims.

I claim as my invention:—

1. A temperature indicating device comprising a heat-conducting member, a heat-responsive member thermally related thereto, a heat-confining shell disposed about the heat-responsive member and a casing for enclosing and supporting the shell.

2. A temperature indicating device comprising a thermal-responsive member, a heat-storage member enclosing said member and a casing to support the heat-storage member and disposed to maintain a dead air space therearound.

3. The combination with an engine, and thermoresponsive means for indicating the temperature thereof, of means for transferring heat from said engine to said thermoresponsive means by conduction.

4. The combination with an engine, and thermoresponsive means for indicating the temperature thereof, of a heat-insulated member for transferring heat from said engine to said thermoresponsive means by conduction.

In testimony whereof, I have hereunto subscribed my name this 29th day of October 1921.

BENJAMIN H. SMITH.